US005317872A

United States Patent [19]

Ingvast

[11] Patent Number: 5,317,872

[45] Date of Patent: Jun. 7, 1994

[54] DEVICE FOR IMPROVEMENT OF RUNNING CONDITION IN HYDRAULIC SYSTEM

[76] Inventor: Hakan Ingvast, Sågudden 21, S-890 23 Själevad, Sweden

[21] Appl. No.: 855,685

[22] PCT Filed: Nov. 5, 1990

[86] PCT No.: PCT/SE90/00714

§ 371 Date: Jun. 18, 1992

§ 102(e) Date: Jun. 18, 1992

[87] PCT Pub. No.: WO91/07596

PCT Pub. Date: May 30, 1991

[30] Foreign Application Priority Data

Nov. 8, 1989 [SE] Sweden ................ 8903739

[51] Int. Cl.[5] ................ F16D 31/02

[52] U.S. Cl. ................ 60/453; 60/456; 60/454

[58] Field of Search ................ 60/477, 478, 453, 454, 60/456, 494, 413, 416, 307, 412; 91/4 R; 137/392, 393, 395

[56] References Cited

U.S. PATENT DOCUMENTS

| | | | |
|---|---|---|---|
| B 358,939 | 1/1975 | Bessiere | 60/453 X |
| 2,741,091 | 4/1956 | Kile | 60/453 |
| 3,130,548 | 4/1964 | Hunt | 60/453 |
| 3,222,866 | 12/1965 | Lehmann | 60/478 |
| 3,825,091 | 7/1974 | Geselbracht et al. | 60/477 X |
| 3,956,893 | 5/1976 | Putnal | 60/477 X |
| 4,030,294 | 6/1977 | Ishida | 60/477 X |
| 4,043,127 | 8/1977 | Kubik | 60/453 |
| 4,184,335 | 1/1980 | Byrne | 60/507 X |
| 4,539,814 | 9/1985 | McKie | 60/413 |

FOREIGN PATENT DOCUMENTS

| | | | |
|---|---|---|---|
| 1503276 | 8/1964 | Fed. Rep. of Germany | 60/478 |
| 197806 | 6/1978 | Fed. Rep. of Germany | 60/477 |
| 779770 | 1/1935 | France | 60/478 |
| 461873 | 9/1990 | Sweden . | |
| 2081425 | 2/1982 | United Kingdom | 60/413 |

*Primary Examiner*—Edward K. Look
*Assistant Examiner*—Hoang Nguyen
*Attorney, Agent, or Firm*—Cushman, Darby & Cushman

[57] ABSTRACT

A device for the improvement of the running conditions in a hydraulic installation or in a so-called hydraulic system. The device contains a central circulating circuit separated from the influence of the atmosphere. To the circulating circuit are connected an outlet and an inlet for the connection of the hydraulic fluid to the other part of the hydraulic system. The circulating circuit is divided into at least two chambers separated by respective pressure generating and pressure reducing units. The first chamber is to a certain extent an expansion room for the hydraulic fluid in the system which is separated from the atmosphere and it forms a low-pressure part in the circuit. The second chamber forms a high-pressure part which is directly connected to the outlet. The circulating circuit holds a medium for the cooling and filtering of the hydraulic fluid.

19 Claims, 3 Drawing Sheets

DEVICE FOR IMPROVEMENT OF RUNNING CONDITION IN HYDRAULIC SYSTEM

BACKGROUND OF THE INVENTION

The present invention relates to a device for the improvement of the running conditions in a hydraulic installation or in a so-called hydraulic system.

A hydraulic system is normally designed with a suction pipe connecting an oil tank to a pump or pumps of a system which directly or indirectly supply the executive units of the system with hydraulic power in the form of hydraulic motors and cylinders. Hydraulic fluid is returned from motors and cylinders to the tank through a return pipe and possibly collected leakage is brought back by means of a drain pipe. The oil tank communicates with the outside air through an airfilter. Because of variations in the enclosed oil volume of the hydraulic system and because of the temperature-depending volume variations, the oil level in the tank will vary and the air in the tank will breathe through the mentioned filter.

Despite the filter, small dirt particles will always pass to the oil from the ambient air and reversedly, at the same time, a limited continous evaporation of oil to the outside air is going on.

Furthermore, the outside air contains water vapour which will condense as water on the cooler inside walls of the tank when the temperature drops below the current saturation temperature of the air. This causes the hydraulic fluid, over a period of time, to be supersaturated with water, resulting in the presence of water in free form in the tank.

Via the contact with the atmosphere, the hydraulic fluid will furthermore be saturated with air. Hydraulic fluid in the form of mineral oil dissolves, e.g., 9 percentage of volume air at room temperature and atmospheric pressure. With dropping pressure, the value of saturation decreases, so that one normally has to take into consideration a certain amount of free air in, e.g., suction pipes in which, related to the atmospheric pressure, a negative pressure easily appears. The hydraulic fluid and certain components, which are parts of the system, are also continuously exposed to oxidation because of the oxygen in the dissolved air.

Air as well as water and dirt particles, i.e., the impurities, are thus not wanted in a hydraulic system, and the availability of the whole system is dependent upon a low level of the mentioned impurities. Another disadvantage which is the result of what has been alleged above is the following:

As mentioned before, the tank is connected to a pump. The suction pipe is dimensioned considering the pressure drop in the pipe between the tank /pump-inlet which leads to a design of short and coarse suction pipes. Despite this dimensioning, problems of cavitation appear at the pump inlet, because of too low a pressure, which particularly occurs if the hydraulic fluid is heavy. The foremost reason for these conditions is normally that the hydraulic fluid in the tank is more or less saturated with air which to a certain extent is dissolved in the suction pipe when the static pressure in the suction pipe drops below the atmospheric pressure.

The known systems comprise filters, sometimes placed in separate filter circuits, and sometimes just as return filters, i.e., fitted in the return pipe. Separate coolers control the temperature of the hydraulic fluid.

As understood by the introductory description, it is not possible in normally designed hydraulic systems to efficiently prevent new particles, water and air from getting into contact with the hydraulic fluid. Furthermore, there is a great risk of cavitation at the suction connections of the pumps, because only atmospheric pressure is available for feeding the pump with hydraulic fluid. The mentioned drawbacks result in problems with, 1.a., component wear, rust damage, rapid fast oil oxidation and cavitation damage.

SUMMARY OF THE INVENTION

The present invention is intended for removal of the problems which have been outlined above.

BRIEF DESCRIPTION OF THE DRAWINGS

The invention will now be described with reference to the attached drawings, wherein FIGS. 1-5 schematically show some embodiments of the device of the present of FIG. 6 shows a longitudinal cross section of a practical construction of the invention.

DETAILED DESCRIPTION

Figure 1:
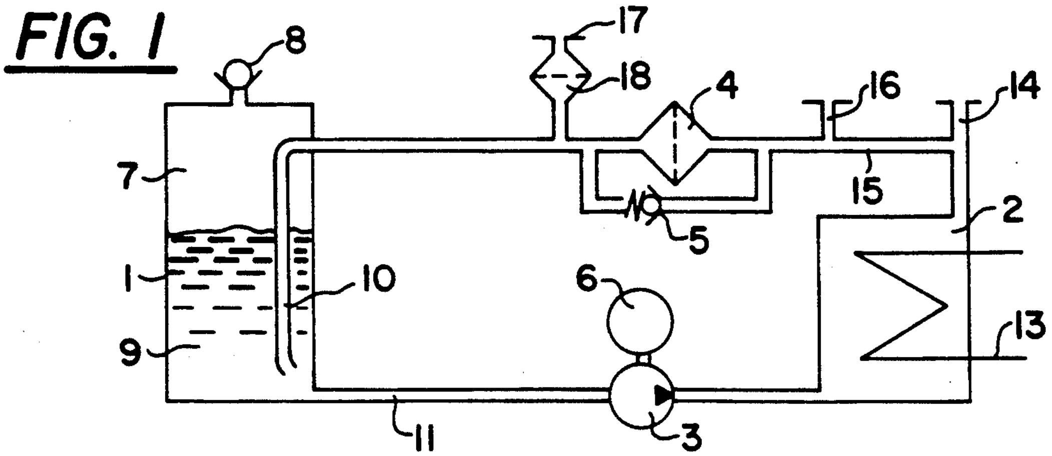

The design according to FIG. 1, comprises a tank device with two improved hydraulic system. The term chambers 1 and 2. Here chamber means the total volume with the same pressure level at circulating flow. Intentionally attached pressure reducing elements such as chokings, spring-loaded non-return valves, filters or coolers therefore separate the chambers. Normal flow losses in pipes, on the other hand are not considered separating elements, and the differences in pressure which might exist in a chamber are caused by such pressure drops in pipes. The chambers 1 and 2 are moreover, separated by a pump 3, which is to pump the hydraulic fluid from the first chamber 1, to the second chamber 2 and, through pressure reducing elements, back to chamber 1. Accordingly, the hydraulic fluid circulates between the two chambers, and the pump could be considered a pressure-generating element. In FIG. 1, the mentioned pressure reducing elements contains a filter 4, designed for purification of the hydraulic fluid, and together with the filter, a connected in parallel, spring-loaded non-return valve 5 which opens for flowing through when the pressure drop over the filter element is too large. The pump 3 is driven by a type of motor 6. Normally, the pressure in the chamber 1 is very low and the chamber is only to a certain part filled with fluid. A non, fluid-filled upper part 7 of the chamber can be connected to a suction device through a non-return valve 8. The suction device is to suck away the air and create a negative pressure in the chamber 1 so, in principle, all free water in the hydraulic fluid is boiled away and the dissolved amount of water and air are reduced in the hydraulic fluid.

The fluid velocity in a central fluid-filled part 9 of the chamber 1 is, for natural reasons, kept low because this facilitates the overs of air and water from the hydraulic fluid. The circulating fluid therefore passes more or less directly from a connection 10 to a pump inlet 11 to make the flow rate low in the central fluid-filled part 9.

The fluid in the chamber 2 passes a cooling element 13, in which water is supposed to be the cooling medium. In principle, cooling elements can be fitted in each chamber of the tank device, but for special reasons, as stated below, the most suitable place is inside chamber 2.

The external connections of the tank device are connected to the circulating circuit at suitable places. Thus, the hydraulic system has a suction pipe 14, connected to the pipe 15 in the circulating circuit, and in this way, it is directly connected to chamber 2. The return pipe 16 of the hydraulic system is also connected to pipe 15, but downstream from the connection of the suction pipe 14.

The absolute pressure in chamber 2, and consequently in connections 14 and 16, is intended to be above the atmospheric pressure, independent of how low the pressure is in chamber 1. In this way, a positive charge pressure is achieved in the suction pipe 14 of the hydraulic system.

Possible drain pipe 17 is preferably connected to chamber 1, suitably via a filter 18 so the normally contaminated drained fluid can not return unfiltered to the suction connection 14.

The tank can be equipped with more than two chambers by series connecting many flow resistances and furnishing the hydraulic fluid with many different pressure levels while circulating. Here, the term chamber means, as before, the total volume of the same pressure level at circulating flow. The advantage of many chambers is that they offer more possibilities to find the right pressure conditions for different partial functionings. With more chambers, the number of possible, partial flow ways for the circulating oil is increased. I.e., connections via pressure-reducing elements can then be opened between two optional chambers, so a wanted amount of oil with desired pressure drop can pass. Such a requirement is a fact for, e.g., filters which herein are considered pressure-reducing elements. Filters are to operate in certain pressure drops and flow conditions in order to work efficiently.

If the system shown in FIG. 1 is completed with another pressure-reducing element connected to the circulating circuit after the connection of the return pipe 16 and before filter 4 and the non-return valve 5, a third chamber is formed, located between the filter and the mentioned pressure reducer. The pressure drop over the filter 4 will then decrease and be adjusted to the level which gives the best functioning.

The connection for the drained oil can then preferably be moved to the mentioned third chamber, in order to cause the drained oil to be filtered by filter 4.

Figure 2:
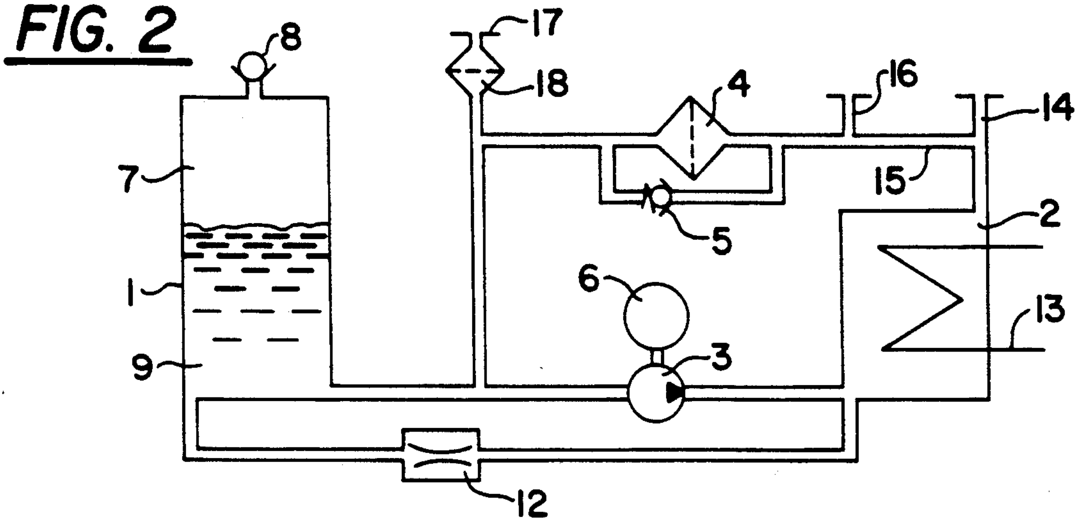

The circulating circuit, according to FIG. 1, can also be modified according to FIG. 2. In accordance with this embodiment there is a pressure-reducing choking 12 which controls the flow rate that passes the central part 9 of the chamber and which is placed in a separate connection between the chamber 1 and 2, while the main flow only passes through the exterior parts of the chamber in which there is the same pressure as in the other parts of the chamber.

In practical application, the tank device must in certain cases be completed for adjustment to current conditions. Such a condition is that certain journal bushings can be part of the hydraulic system and the bushings are not adjusted to tighten against high negative pressures. A consequence of this fact is that the negative pressure, generated in chamber 1, must either be adjusted to acceptable values for the bushings or the negative pressure must be prevented from reaching those sensitive components, even when the drive of the tank device is shut off, i.e., when the negative pressure spreads in the whole device. One way of preventing the negative pressure from spreading is to fit non-return valves with well-defined opening pressures in the connections between the tank device and the current components of the hydraulic system.

It is always desired to stop leakage from a hydraulic system. In an absolute sense it is not possible completely stop leakage but the described device contains a possibility to limit the amount of the leaking fluid volume. The principle of this leakage guard is to short-circuit the chambers 1 and 2 if the fluid level in chamber 1 sinks below a predetermined level. At this level, the positive pressure in the chamber 2 is transformed to the same negative pressure as in chamber 1. The pumps connected to the suction connections will now cavitate and the hydraulic fluid will stop flowing out. This pressure equalizing in the tank is preferably achieved by stopping the driving motor 6 of the circulating pump when indicated by the level guard.

Figure 3:
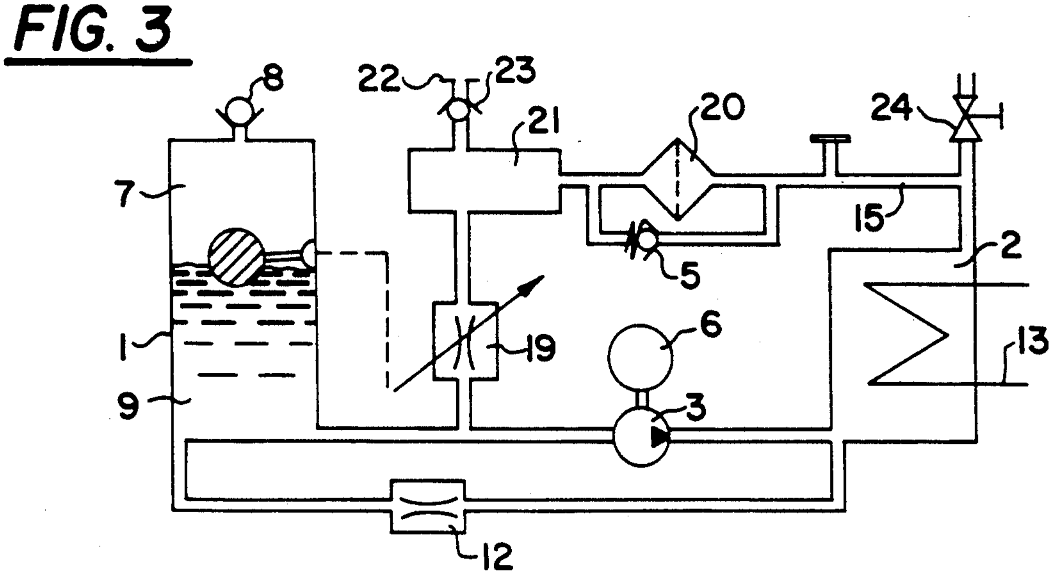

The tank device is also intended for the reconditioning of already used hydraulic fluid or for connection to a lubrication oil system. In both these cases, a certain fluid flow is proportioned from the tank to a system, open to the atmosphere, which means that the automatic refilling that takes place if the system is closed, disappears. To make it possible to refill the same amount of fluid as is proportioned out, a choking device 19, controlled by the fluid level in chamber 1, is fitted in the circulation. See FIG. 3.

The operating pressures of the chamber 1 and 2 are assumed to be respectively below and above the atmospheric pressure. In each circulating circuit which passes the chambers there is therefore a point where there is atmospheric pressure. In this embodiment, the electrical or mechanically operating, level-indicating choking device 19 is connected in series to at least another flow resistance, here represented by a filter 20. Between those two flow resistances there is now definitionwise a chamber 21 to which there is a connection 22 and a non-return valve 23.

The choking device is variable and at a certain fluid level it is arranged to create such a flow resistance in the circuit as to cause atmospheric pressure in chamber 21, i.e. in the external connection 22. If oil is proportioned out from a valve 24, in direct connection with the chamber 2, the oil level sinks in chamber 1 and the choking 19 gives a reduced flow resistance, which results in a sinking pressure in the chamber 21, and the connection 22 becomes self-priming via the non-return valve 23.

In the shown embodiment, the choking device 19 has been located downstream the filter 20. Those elements can be reversed without any disfunctional problems, resulting in a location of the filter 20 downstream from the choking device 19. The control device must then be reversed to decrease the choking resistance when the level increases.

Figure 4:
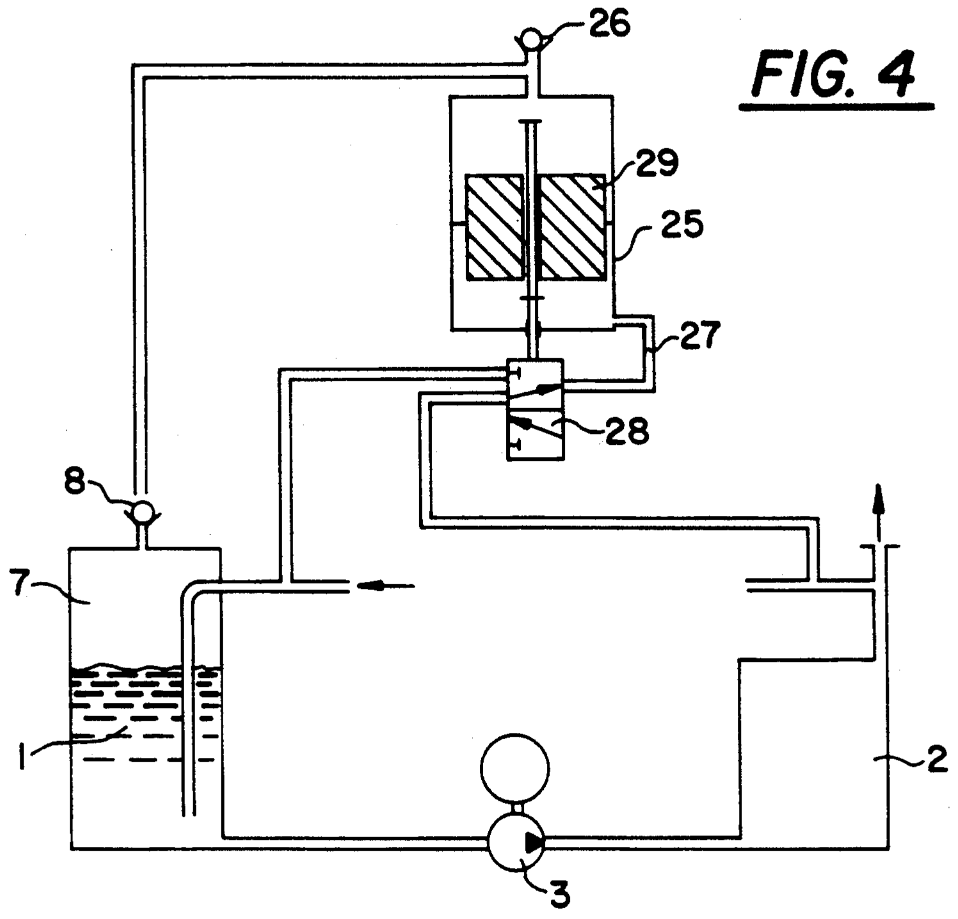
Figure 5:
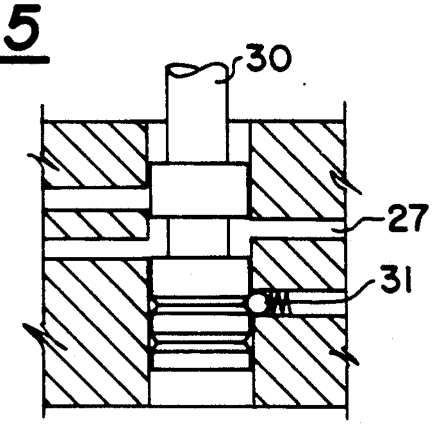

The suction device, connected to the upper part of chamber 1, is either a rotating displacement pump of type piston, wing or diaphragm. The driving of this suction pump can preferably be achieved by means of the driving motor 6, and the pump can be fitted inside or outside the tank. The suction device can also be a water- or air-driven ejector, or a device according to FIGS. 4 and 5, having the following function:

A separate vessel 25 in its upper part is fitted with a spring-loaded non-return valve 26, which opens to the ambient air for an inside positive pressure in the vessel 25, and it has another connection to a non-return valve 8, which is in connection with the fluid-free part 7 in chamber 1. To the lower part of the vessel, a connection 27 is connected, and so is a bistable rocker which either is in the form of a fluidistor, or, as shown in FIGS. 4 and 5, in the form of a mechanical valve with two stable positions and controlled by the force of the floater 29. The floater moves between an upper and lower terminal stop, connected to a valve element 30 in the valve 28. The valve 28 is connected to the chamber 2 to enable hydraulic fluid to be transferred from this chamber 2 to the vessel 25, and it is also connected to the chamber 1 to enable hydraulic fluid to be recieved from the vessel. When the level sinks in the vessel 25, and when the pressure on top of the fluid level tends to become lower than in chamber 1, new air is supplied through the non-return valve 8. When the floater has reached its lower terminal position, the reversing force of the valve element is gradually increasing with sinking fluid level, until the holding force of a blocking element 31 is overcome. The valve element 30 now shifts position and the connection 27 is now connected to the chamber 2. The level in the vessel 25 increases and the pressure over the fluid level increases until the valve 26 limits the pressure and releases air to the ambient air. At the upper position of the level, the floater again gets in direct or indirect contact with the valve element and, in the same way as before, its position is shifted and the fluid level will sink. The device has now made one stroke and a certain amount of the entrapped air has been evacuated.

Figure 6:
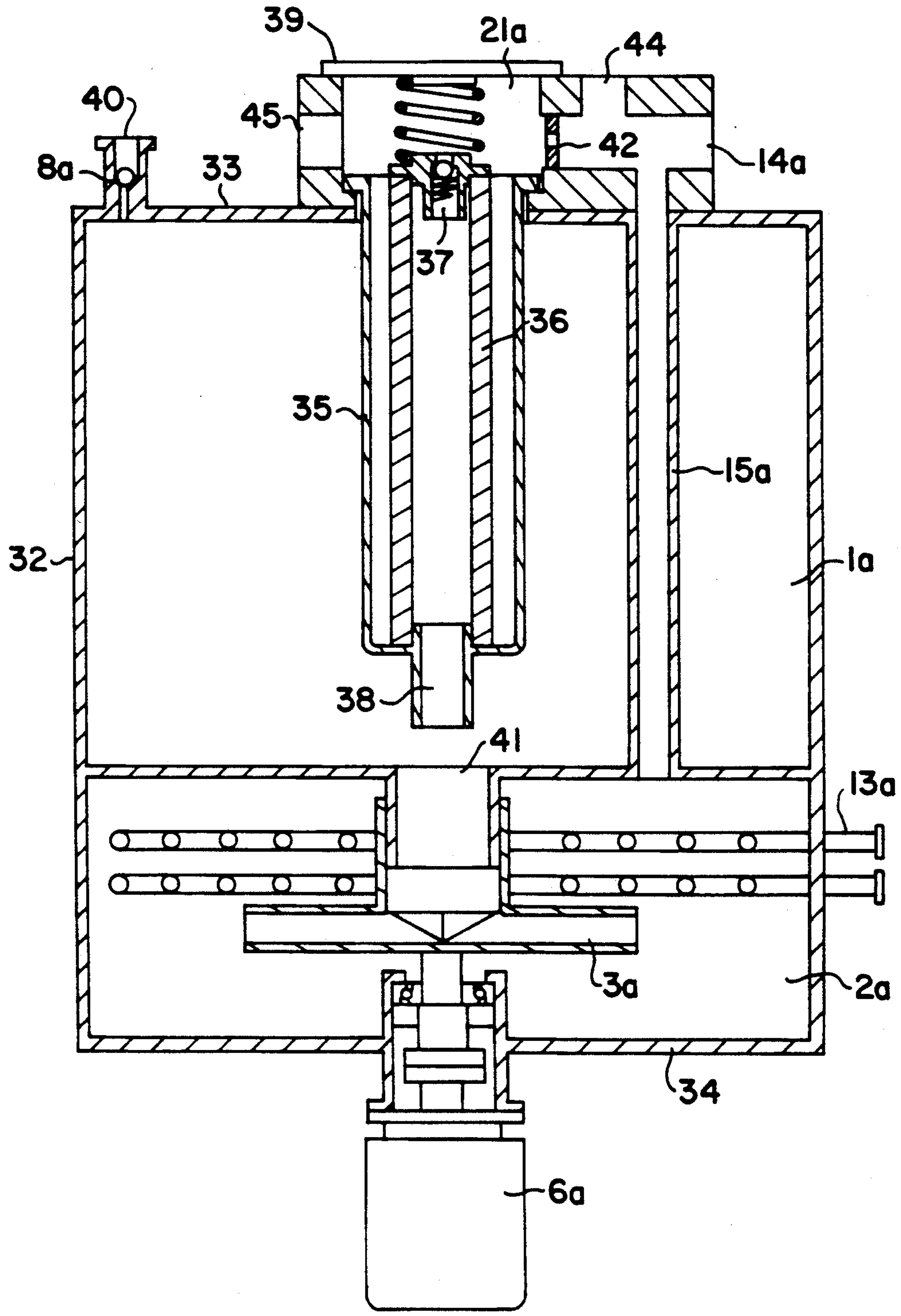

FIG. 6 shows a longitudinal cross-section of a practical construction of the device, in which the different parts can be identified by means of descriptions hereinabove in relation to FIGS. 1–5.

The device below called the tank, comprises externally a cylinder-shaped body 32 with either plane or arched gables 33 and 34. In the upper part of the tank there is a not fully fluid-filled chamber 1*a*, normally with negative pressure and in the lower part there is a chamber 2*a*, with positive pressure, working as a pump housing. In the top edge of the tank, there is a chamber 21*a*, which comprises a centrally, in chamber 1*a* placed filter housing 35 which also holds a filter element 36. A non-return valve 37 is fitted to the top gable of the filter element. Filtering is accomplished according to the principle from outside, and, i.e., filtered oil is in the filter element 36 and passes through the filter return pipe 38 on to the circulation. The filter housing 35 with its contents is accessible through an opening cover 39.

The tank is connected to the ambient air via a non-return valve 8*a* and connection 40. The non-return valve 8*a* prevents the chamber 1*a* from being exposed to positive pressure and the connection 40 is used when required for connection of a vacuum pump. The tank is furthermore furnished with other not herein shown connections for level guard or level indicator and for pressure indicator. The chamber 1*a* is connected to a centrifugal pump 3*a* via a vertical and centrally located supply channel 41 where also the filter return pipe 38 has its discharge opening.

The rotor of the centrifugal pump 3*a* has suitably a straight wing profile which makes its pressure building-up more or less independent of the pumped flow. The rotor is journalled at the drive shaft and at the supply channel 41 and the rotor is powered by an electric or hydraulic motor 6*a*. The driving motor 6*a*, in an alternate design, is fitted in the tank. Cooling coils 13*a* for connection of water are located to achieve close contact with the turbulent flow in chamber 2*a* that is caused by the pump rotor. A pipe 15*a* in chamber 2*a* passes to the upper gable 33 of the tank and is connected to chamber 21*a* via choking 42. This choking is sharp-edged an gives a pressure drop which, within certain limits, is almost independent of the viscosity of the oil.

The tank is connected to the hydraulic system via connecting openings, 14*a*, respectively, for suction pipe 44*a* for return pipe and 45 for a drain pipe.

I claim:

1. Apparatus for improving operation conditions in a hydraulic system or a lubrication system, the apparatus being a part of the system and comprising a tank means, wherein a fluid-operated device is connected with the apparatus via a suction pipe and a return pipe, and wherein the device is supplied with fluid through a suction pipe inlet and the fluid being returned through a return pipe outlet, said apparatus comprising:
   - a fluid pressure-generating element having a suction side and a pressure side;
   - said tank means comprising a first chamber; said first chamber being arranged normally to be only partly filled with fluid, so as to have a head space above a liquid level in said first chamber; said head space having a below-atmospheric pressure; said first chamber being arranged to serve as an expansion chamber for the fluid in said system; and said fluid pressure-generating element being arranged to pressurize the fluid which is brought therethrough by operation thereof, to a pressure in said suction pipe inlet which is higher than that prevailing within said first chamber.

2. The apparatus of claim 1 further including:
   - a suction-generating means communicating with said head space, for maintaining said head space of said first chamber at said below-atmospheric pressure.

3. The apparatus of claim 1, further including:
   - means providing an internal fluid circulation circuit for said fluid, said fluid pressure-generating element being incorporated in said circuit;
   - said circuit having a circuit outlet for connection to said suction pipe inlet for supplying said device with fluid, and said circuit having a circuit inlet for connection to said return pipe outlet for fluid from said device; said circuit outlet being located upstream of said circuit inlet in said circuit, relative to said pressure side of said fluid pressure-generating element.

4. The apparatus of claim 3, wherein:
   - said tank means further includes a second chamber, said second chamber being incorporated in said circuit between said pressure side of said fluid pressure-generating element and said circuit outlet, so that the fluid can be conducted from said first chamber to said second chamber by operation of said fluid pressure-generation element;
   - said circuit including at least one portion having at least one pressure-reducing means, said circuit portion effectively connecting said second chamber to said first chamber for streaming the fluid from said second chamber to said first chamber.

5. The apparatus of claim 2, further including:
   - means providing an internal fluid circulation circuit for said fluid, said fluid pressure-generating element being incorporated in said circuit;
   - said circuit having a circuit outlet for connection to said suction pipe inlet for supplying said device with fluid, and said circuit having a circuit inlet for connection to said return pipe outlet for fluid from said device; said circuit outlet being located upstream of said circuit inlet in said circuit, relative to said pressure side of said fluid pressure-generating element.

6. The apparatus of claim 5, wherein:

said tank means further includes a second chamber, said second chamber being incorporated in said circuit between said pressure side of said fluid pressure-generating element and said circuit outlet, so that the fluid can be pumped from said first chamber to said second chamber by operation of said fluid pressure-generation element;

said circuit including at least one portion having least one pressure-reducing means, said circuit portion effectively connecting said second chamber to said first chamber for streaming the fluid from said second chamber to said first chamber.

7. The apparatus of claim 1, wherein:

said fluid pressure-generating element comprises a centrifugal pump.

8. The apparatus of claim 4, wherein:

said tank means comprises said first and second chambers, and first chamber being located in an upper part and the second chamber being located in a lower part of said tank means.

9. Apparatus for reconditioning contaminated fluids, wherein a fluid is suctioned into the apparatus at an inlet connection thereof, reconditioned and pumped out of the apparatus at an outlet connection thereof, said apparatus comprising:

a fluid pressure-generating element having a suction side and a pressure side;

means providing an internal fluid circulation circuit for the fluid, said fluid pressure-generating element being incorporated in said circuit;

said circuit having an outlet for recovered fluid and an inlet for unrecovered fluid; said outlet being located upstream of said inlet in said circuit, relative to said pressure side of said fluid pressure-generating element;

a first chamber incorporated in said circuit between said circuit inlet and said suction side of said fluid pressure-generating device; said first chamber being arranged normally to be only partly filled with fluid, so as to have a head space above a liquid level in said first chamber;

said head space being disposed at below-atmospheric pressure by communication with a suction-generating means; and said pressure-generating element being arranged to create a pressure in said outlet and inlet connections of the apparatus, which is higher than said pressure in said first chamber.

10. Apparatus for improving operating conditions in a hydraulic system in which a pressurized hydraulic fluid-operated device is supplied with pressurized hydraulic fluid through at least one device inlet, and returns hydraulic fluid through at least one device outlet, said apparatus comprising:

a fluid pressure-generating element having a suction side and a pressure side;

means providing an internal fluid circulation circuit for hydraulic fluid, said fluid pressure-generating element being incorporated in said circuit;

said circuit having a circuit outlet for connection to said device inlet for supplying said device with pressurized hydraulic fluid, and said circuit having a circuit inlet for connection to said device outlet for recovering hydraulic fluid from said device; said circuit outlet being located upstream of said circuit inlet in said circuit, relative to said pressure side of said fluid pressure-generating element;

a tank means including a first chamber incorporated in said circuit between said circuit inlet and said suction side of said fluid pressure-generating device; said first chamber being isolated from direct atmospheric contact; said first chamber being arranged normally to be only partly filled with hydraulic fluid, so as to have a head space above a liquid level in said first chamber; and suction-generating means communicating through said first chamber with said head space, for maintaining said head space of said first chamber at a below-atmospheric pressure;

said first chamber being arranged to serve as an expansion chamber for said circuit; and said fluid pressure-generating element being arranged to pressurize hydraulic fluid which is drawn therethrough by operation thereof, to a pressure which is higher than that prevailing within said first chamber.

11. The apparatus of claim 10, wherein:

said tank means further includes a second chamber, said second chamber being incorporated in said circuit between said pressure side of said fluid pressure-generating element and said circuit outlet, so that hydraulic fluid can be pumped from said first chamber to said second chamber by operation of said fluid pressure-generating element; and said circuit including at least one portion having at least one pressure-reducing means, said circuit portion effectively connecting said second chamber to said first chamber for streaming pressurized hydraulic fluid from said second chamber to said first chamber without leaving said apparatus.

12. The apparatus of claim 11, further including:

heat transfer means associated with said circuit between said pressure side of said fluid pressure generating element and said circuit outlet, and arranged for cooling hydraulic fluid in said circuit.

13. The apparatus of claim 11, further including:

filtering means incorporated in said circuit between said circuit inlet and said first chamber, for filtering debris from hydraulic fluid returning to said apparatus from said device.

14. The apparatus of claim 11, wherein:

said suction generating means includes:

a third chamber, effectively incorporated in said circuit between said circuit inlet and said first chamber and arranged normally to be only partly filled with hydraulic fluid, so as to have a head space above a liquid level in said third chamber;

a suction line communicating said head space of said first chamber with said head space of said third chamber;

a first non-return valve incorporated in said suction line for permitting headspace fluid flow from said first chamber to said third chamber but prohibiting reverse headspace fluid flow; and a second non-return valve provided between said third chamber and atmosphere, for permitting exhausting of headspace fluid to atmosphere as said liquid level in said third chamber is rising but prohibiting entry of atmospheric air into said third chamber as said liquid level in said third chamber is falling, wherein headspace fluid is sucked from said first chamber to said third chamber as said liquid level is falling in said third chamber, and is exhausted to atmosphere from said third chamber as said liquid level is rising in said third chamber.

15. The apparatus of claim 11, wherein:

said pressure-reducing means comprises a choke arranged to cause pressure at said circuit inlet to increase as said liquid level rises in said first chamber and to decrease as said liquid level falls in said first chamber.

16. The apparatus of claim 11, wherein:

said tank means includes a wall which divides said second chamber from said first chamber and defines respective portions of said first and second chambers.

17. The apparatus of claim 12, wherein:

said fluid pressure-generating element comprises a centrifugal pump having a rotating rotor disposed in said second chamber; and said heat transfer means comprises cooling coils disposed in said second chamber.

18. The apparatus of claim 16, wherein:

said tank means encloses said first and second chambers, with said first chamber being located above said second chamber; and said tank means also encloses said portion of said circuit having said pressure-reducing means.

19. The apparatus of claim 11, wherein:

said fluid pressure-generating element, said pressure-reducing means and said suction-generating means cooperating to provide a lower pressure in said first chamber than at both said circuit inlet and said circuit outlet.

* * * * *